United States Patent
Struhsaker

(10) Patent No.: US 10,264,562 B2
(45) Date of Patent: Apr. 16, 2019

(54) TDD FDD COMMUNICATION INTERFACE

(75) Inventor: Paul F. Struhsaker, Plano, TX (US)

(73) Assignee: Access Solutions, Ltd., Dallas, TX (US)

( * ) Notice: Subject to any disclaimer, the term of this patent is extended or adjusted under 35 U.S.C. 154(b) by 0 days.

(21) Appl. No.: 13/532,650

(22) Filed: Jun. 25, 2012

(65) Prior Publication Data

US 2012/0263079 A1      Oct. 18, 2012

Related U.S. Application Data

(63) Continuation of application No. 11/982,404, filed on Oct. 31, 2007, now abandoned, which is a
(Continued)

(51) Int. Cl.

| | |
|---|---|
| *H04B 1/56* | (2006.01) |
| *H04W 72/04* | (2009.01) |
| *H04W 84/14* | (2009.01) |
| *H04J 3/00* | (2006.01) |
| *H04J 1/00* | (2006.01) |
| *H04B 7/00* | (2006.01) |

(Continued)

(52) U.S. Cl.
CPC ......... *H04W 72/042* (2013.01); *H04W 84/14* (2013.01); *H04W 84/12* (2013.01); *H04W 88/02* (2013.01); *H04W 88/08* (2013.01)

(58) Field of Classification Search
CPC ........... H04B 1/56; H04B 1/58; H04W 84/14; H04W 72/042; H04W 84/12; H04W 88/02; H04W 88/08

USPC ......................................................... 370/276
See application file for complete search history.

(56) References Cited

U.S. PATENT DOCUMENTS

| | | |
|---|---|---|
| 4,797,898 A | 1/1989 | Martinez |
| 5,115,463 A | 5/1992 | Moldaysky et al. |

(Continued)

FOREIGN PATENT DOCUMENTS

| | | |
|---|---|---|
| EP | 0444841 | 12/1899 |
| EP | 0304955 | 3/1989 |

(Continued)

OTHER PUBLICATIONS

Office Action dated May 4, 2011 in in U.S. Appl. No. 11/982,424.
(Continued)

*Primary Examiner* — Huy C Ho
(74) *Attorney, Agent, or Firm* — Byrne Poh LLP

(57) ABSTRACT

TDD access equipment modified by introducing a frequency change at the normal TDD guard point, with respective downlink or uplink periods for individual subscriber stations offset to form overlapping frames. Cyclo-stationary processing, block equalization, and burst timing coordination allow the boundary between downlink and uplink portions of both frames to be set dynamically, improving spectral efficiency. Fast frequency switching within an allotted physical slot enables synchronization of time-sharing the dedicated frequencies to be maintained among subscriber stations. Duplex spacing between downlink and uplink frequencies for individual subscriber stations, combined with in-depth filtering of received signals, prevents spurious out-of-band transmission signal strength from reaching an interference level.

2 Claims, 8 Drawing Sheets

Related U.S. Application Data continuation of application No. 09/839,499, filed on Apr. 20, 2001, now Pat. No. 7,346,347.

(60) Provisional application No. 60/262,708, filed on Jan. 19, 2001, provisional application No. 60/262,712, filed on Jan. 19, 2001, provisional application No. 60/262,825, filed on Jan. 19, 2001, provisional application No. 60/262,698, filed on Jan. 19, 2001, provisional application No. 60/262,827, filed on Jan. 19, 2001, provisional application No. 60/262,826, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 21, 2001, provisional application No. 60/270,385, filed on Feb. 21, 2001, provisional application No. 60/270,430, filed on Feb. 21, 2001.

(51) Int. Cl.

| | |
|---|---|
| H04B 7/005 | (2006.01) |
| H04B 7/14 | (2006.01) |
| H04B 7/204 | (2006.01) |
| H04B 7/216 | (2006.01) |
| H04B 7/212 | (2006.01) |
| H04W 84/12 | (2009.01) |
| H04W 88/02 | (2009.01) |
| H04W 88/08 | (2009.01) |

(56) References Cited

U.S. PATENT DOCUMENTS

| | | |
|---|---|---|
| 5,416,831 A | 5/1995 | Chewning et al. |
| 5,475,735 A | 12/1995 | Williams et al. |
| 5,490,252 A | 2/1996 | Macera et al. |
| 5,603,095 A | 2/1997 | Uola |
| 5,604,789 A | 2/1997 | Lerman |
| 5,625,623 A | 4/1997 | Kent et al. |
| 5,638,371 A | 6/1997 | Raychaudhuri et al. |
| 5,659,605 A | 8/1997 | Voit et al. |
| 5,673,307 A | 9/1997 | Holland et al. |
| 5,684,791 A | 11/1997 | Raychaudhuri et al. |
| 5,694,424 A | 12/1997 | Ariyavisitakul |
| 5,732,076 A | 3/1998 | Ketseoglou et al. |
| 5,745,837 A | 4/1998 | Fuhrmann |
| 5,745,841 A | 4/1998 | Reudink et al. |
| 5,790,936 A | 8/1998 | Dinkins |
| 5,809,086 A | 9/1998 | Ariyavisitakul |
| 5,884,148 A | 3/1999 | Bilgic et al. |
| 5,901,352 A | 5/1999 | St-Pierre et al. |
| 5,915,215 A | 6/1999 | Williams et al. |
| 5,933,776 A | 8/1999 | Kirkpatrick |
| 5,991,292 A | 11/1999 | Focsaneanu et al. |
| 5,995,851 A | 11/1999 | Lim |
| 5,999,818 A | 12/1999 | Gilbert et al. |
| 6,014,546 A | 1/2000 | Georges et al. |
| 6,016,311 A | 1/2000 | Gilbert et al. |
| 6,023,459 A | 2/2000 | Clark et al. |
| 6,023,462 A | 2/2000 | Nieczyporowicz et al. |
| 6,035,178 A | 3/2000 | Chennakeshu et al. |
| 6,052,408 A | 4/2000 | Struhsaker et al. |
| 6,097,968 A | 8/2000 | Bannister et al. |
| 6,115,367 A | 9/2000 | Archambaud |
| 6,150,955 A | 11/2000 | Tracy et al. |
| 6,163,698 A | 12/2000 | Leitch et al. |
| 6,185,412 B1 | 2/2001 | Pentikainen et al. |
| 6,188,873 B1 | 2/2001 | Wickman et al. |
| 6,192,248 B1 | 2/2001 | Solondz |
| 6,208,871 B1 | 3/2001 | Hall et al. |
| 6,222,503 B1 | 4/2001 | Gietema et al. |
| 6,226,274 B1 * | 5/2001 | Reese et al. .................. 370/280 |
| 6,289,213 B1 | 9/2001 | Flint et al. |
| 6,324,384 B1 | 11/2001 | Nobuyasu et al. |
| 6,363,252 B1 | 3/2002 | Hamalainen et al. |
| 6,374,078 B1 | 4/2002 | Williams et al. |
| 6,377,800 B1 | 4/2002 | Cho |
| 6,378,119 B1 | 4/2002 | Raves |
| 6,411,825 B1 | 6/2002 | Csapo et al. |
| 6,421,329 B1 | 7/2002 | Kikinis |
| 6,526,290 B1 | 2/2003 | Yla-Mella et al. |
| 6,560,213 B1 | 5/2003 | Izadpanah et al. |
| 6,564,051 B2 | 5/2003 | Struhsaker et al. |
| 6,587,444 B1 * | 7/2003 | Lenzo et al. .................. 370/330 |
| 6,600,914 B2 | 7/2003 | Uhlik et al. |
| 6,611,507 B1 | 8/2003 | Hottinen et al. |
| 6,654,384 B1 | 11/2003 | Reza et al. |
| 6,654,605 B1 | 11/2003 | Seo |
| 6,697,606 B1 | 2/2004 | Wagemans et al. |
| 6,792,286 B1 | 9/2004 | Bharath et al. |
| 6,804,527 B2 | 10/2004 | Struhsaker et al. |
| 6,836,546 B1 | 12/2004 | Willer |
| 6,839,333 B1 * | 1/2005 | Åkerberg ............ H04W 56/003 370/322 |
| 6,839,334 B1 | 1/2005 | Krishnamoorthy et al. |
| 6,859,655 B2 | 2/2005 | Struhsaker |
| 6,891,810 B2 | 5/2005 | Struhsaker et al. |
| 6,925,072 B1 | 8/2005 | Grohn |
| 6,925,516 B2 | 8/2005 | Struhsaker et al. |
| 6,947,477 B2 | 9/2005 | Struhsaker et al. |
| 6,954,432 B1 | 10/2005 | Bychowsky et al. |
| 7,002,929 B2 | 2/2006 | Struhsaker et al. |
| 7,010,023 B1 | 3/2006 | Sato |
| 7,031,738 B2 | 4/2006 | Struhsaker |
| 7,035,241 B2 | 4/2006 | Struhsaker |
| 7,061,886 B1 | 6/2006 | Moon et al. |
| 7,065,098 B2 | 6/2006 | Struhsaker et al. |
| 7,069,047 B2 | 6/2006 | Struhsaker et al. |
| 7,075,967 B2 | 6/2006 | Struhsaker et al. |
| 7,099,339 B1 | 8/2006 | Wang et al. |
| 7,099,383 B2 | 8/2006 | Struhsaker et al. |
| 7,173,916 B2 | 2/2007 | Struhsaker et al. |
| 7,218,890 B1 | 5/2007 | Iseli et al. |
| 7,230,931 B2 | 6/2007 | Struhsaker |
| 7,239,618 B1 | 7/2007 | La Porta et al. |
| 7,274,946 B2 | 9/2007 | Struhsaker |
| 7,292,844 B2 | 11/2007 | Dowling et al. |
| 7,366,133 B1 | 4/2008 | Majidi-Ahy et al. |
| 7,606,189 B1 | 10/2009 | Lee et al. |
| 7,764,228 B2 | 7/2010 | Durst et al. |
| 8,018,907 B2 | 9/2011 | Kubler |
| 2001/0004595 A1 | 6/2001 | Dent |
| 2001/0033561 A1 | 10/2001 | Rodin |
| 2001/0041569 A1 | 11/2001 | Rahman |
| 2001/0046859 A1 | 11/2001 | Kil |
| 2002/0058513 A1 | 5/2002 | Klein et al. |
| 2002/0065063 A1 | 5/2002 | Uhlik et al. |
| 2002/0097694 A1 | 7/2002 | Struhsaker |
| 2002/0098799 A1 | 7/2002 | Struhsaker et al. |
| 2002/0098858 A1 | 7/2002 | Struhsaker |
| 2002/0141355 A1 * | 10/2002 | Struhsaker et al. ......... 370/280 |
| 2002/0152053 A1 | 10/2002 | Roy et al. |
| 2002/0164991 A1 | 11/2002 | Arazi et al. |
| 2002/0171581 A1 | 11/2002 | Sheynblat et al. |
| 2004/0213188 A1 | 10/2004 | Struhsaker et al. |
| 2005/0048985 A1 | 3/2005 | Haartsen |
| 2005/0243745 A1 * | 11/2005 | Stanwood et al. ............ 370/280 |

(56) References Cited

U.S. PATENT DOCUMENTS

2006/0233161 A1   10/2006  Koenck et al.
2012/0147797 A1*  6/2012  Furuskar et al. ............ 370/281

FOREIGN PATENT DOCUMENTS

| EP | 0690637 | 1/1996 |
|---|---|---|
| EP | 0690638 | 1/1996 |
| WO | WO/1997/041699 | 11/1997 |
| WO | WO/1998/024254 | 6/1998 |
| WO | WO/99/09762 | 2/1999 |
| WO | WO/1999/009762 | 2/1999 |
| WO | WO/1999/026437 | 5/1999 |
| WO | WO/99/29126 | 6/1999 |
| WO | WO/1999/027720 | 6/1999 |
| WO | WO/1999/029126 | 6/1999 |
| WO | WO/1999/037059 | 7/1999 |
| WO | WO/1999/051043 | 10/1999 |
| WO | WO/2001/056233 | 8/2001 |

OTHER PUBLICATIONS

Office Action dated May 23, 2011 in in U.S. Appl. No. 11/982,404.
Office Action dated Jun. 27, 2011 in in U.S. Appl. No. 11/982,459.
Office Action dated Jul. 1, 2013 in in U.S. Appl. No. 13/488,374.
Office Action dated Jul. 6, 2011 in in U.S. Appl. No. 11/982,458.
Office Action dated Sep. 2, 2010 in in U.S. Appl. No. 11/982,404.
Office Action dated Sep. 16, 2010 in in U.S. Appl. No. 11/982,461.
Office Action dated Sep. 29, 2010 in in U.S. Appl. No. 11/982,459.
Office Action dated Oct. 13, 2010 in in U.S. Appl. No. 11/982,458.
Office Action dated Oct. 17, 2012 in in U.S. Appl. No. 13/488,374.
Office Action dated Oct. 29, 2010 in in U.S. Appl. No. 11/982,463.
European Telecommunications Standards Institute, "Broadband Radio Access Networks, Inventory of Broadband Radio Technologies and Techniques", ETSI TR 101 173 V1.1, May 1998, chapter 7, pp. 29-38.
Goodman, D. J. et. al., "Packet Reservation Multiple Access for Local Wireless Communications", In IEEE Transactions on Communications, vol. 37, No. 8, Aug. 1989, pp. 885-890.
Kubbar, O. and Mouftah, H.T., "Multiple Access Control Protocols for Wireless ATM: Problems Definition and Design Objectives", In IEEE Comunication Magazine, vol. 35, No. 11, Nov. 1997, pp. 93-99.
Office Action dated May 4, 2011 in U.S. Appl. No. 11/982,424.
Office Action dated May 23, 2011 in U.S. Appl. No. 11/982,404.
Office Action dated Jun. 14, 2012 in U.S. Appl. No. 13/488,374.
Office Action dated Jun. 27, 2011 in U.S. Appl. No. 11/982,459.
Office Action dated Jul. 1, 2013 in U.S. Appl. No. 13/488,374.
Office Action dated Jul. 6, 2011 in U.S. Appl. No. 11/982,458.
Office Action dated Aug. 17, 2012 in U.S. Appl. No. 13/567,978.
Office Action dated Sep. 2, 2010 in U.S. Appl. No. 11/982,404.
Office Action dated Sep. 16, 2010 in U.S. Appl. No. 11/982,461.
Office Action dated Sep. 29, 2010 in U.S. Appl. No. 11/982,424.
Office Action dated Sep. 29, 2010 in U.S. Appl. No. 11/982,459.
Office Action dated Oct. 13, 2010 in U.S. Appl. No. 11/982,458.
Office Action dated Oct. 17, 2012 in U.S. Appl. No. 13/488,374.
Office Action dated Oct. 29, 2010 in U.S. Appl. No. 11/982,463.
Office Action dated May 7, 2004 in U.S. Appl. No. 09/839,499.
Office Action dated Jul. 21, 2006 in U.S. Appl. No. 09/839,499.
Rappaport, T., "Wireless Communications, Principles and Practice", IEEE Press, 1996, chapter 8, pp. 395-436.
Roman, V.I., "Frequency Reuse and System Deployment in Local Multipoint Distibution Service," IEEE Personal Communications, Dec. 1999, pp. 20-27.
Sklar, B., "Digital Communications Fundamentals and Applications", Prentice Hall, 1988, chapter 9, pp. 520-597.
U.S. Appl. No. 10/042,705, filed Nov. 15, 2000.
U.S. Appl. No. 11/982,424, filed Oct. 31, 2007.
U.S. Appl. No. 11/982,458, filed Oct. 31, 2007.
U.S. Appl. No. 11/982,459, filed Oct. 31, 2007.
U.S. Appl. No. 11/982,461, filed Oct. 31, 2007.
U.S. Appl. No. 11/982,463, filed Oct. 31, 2007.
U.S. Appl. No. 13/488,374, filed Jun. 4, 2012.
Notice of Allowance dated Feb. 26, 2016 in U.S. Appl. No. 14/595,208.
Office Action dated Feb. 18, 2015 in U.S. Appl. No. 14/595,208.
Office Action dated Oct. 13, 2010 in U.S. Appl. No. 11/903,508.
Office Action dated Oct. 15, 2015 in U.S. Appl. No. 14/595,208.
U.S. Appl. No. 11/903,508 filed Sep. 21, 2007.
Notice of Allowance dated Jun. 20, 2014 in U.S. Appl. No. 13/488,374.
Notice of Allowance dated Sep. 30, 2014 in U.S. Appl. No. 13/567,978.
Office Action dated Jun. 14, 2013 in U.S. Appl. No. 13/532,650.
Povey, G.J., et al., "TDD-CDMA Extension to FDD-CDMA Based Third Generation Cellular System," In Proceedings of IEEE 6th International Conference on Universal personal communications Record, San Diego, CA, Oct. 12-16, 1997, vol. 2, pp. 813-817.
Office Action dated Feb. 23, 2005 in U.S. Appl. No. 09/838,924.
Office Action dated Feb. 27, 2006 in U.S. Appl. No. 09/838,924.
Office Action dated Mar. 15, 2007 in U.S. Appl. No. 09/839,499.
Office Action dated Mar. 29, 2004 in U.S. Appl. No. 09/839,075.
Office Action dated Jun. 22, 2004 in U.S. Appl. No. 09/838,924.
Office Action dated Oct. 10, 2003 in U.S. Appl. No. 09/839,499.
Office Action dated Dec. 11, 2003 in U.S. Appl. No. 09/838,924.
Sprint Exhibit 1005, Petition for IPR Review of U.S. Pat. No. 7,173,916, Aug. 3, 2018.
Sprint Exhibit 1006, Petition for IPR Review of U.S. Pat. No. 6,891,810, Aug. 3, 2018.
*Sprint Spectrum L.P.* v. *General Access Solutions, Ltd.*, Case IPR2017-001889, U.S. Pat. No. 7,230,931, Patent Owner's Response, Aug. 3, 2018.
*Sprint Spectrum L.P.* v. *General Access Solutions, Ltd.*, Case IPR2017-01885, U.S. Pat. No. 6,891,916, Patent Owner's Response, Aug. 3, 2018.
*Sprint Spectrum L.P.* v. *General Access Solutions, Ltd.*, Case IPR2017-01887, U.S. Pat. No. 6,891,810, Patent Owner's Response, Aug. 3, 2018.
*Sprint Spectrum L.P.* v. *General Access Solutions, Ltd.*, Petition for Inter Partes Review of U.S. Pat. No. 6,891,810 under 35 U.S.C. §§ 311-319 and 37 C.F.R. § 42.100, Jul. 28, 2017.
*Sprint Spectrum L.P.* v. *General Access Solutions, Ltd.*, Petition for Inter Partes Review of U.S. Pat. No. 7,173,916 under 35 U.S.C. §§ 311-319 and 37 C.F.R. § 42.100, Jul. 28, 2017.
*Sprint Spectrum L.P.* v. *General Access Solutions, Ltd.*, Petition for Inter Partes Review of U.S. Pat. No. 7,230,931 under 35 U.S.C. §§ 311-319 and 37 C.F.R. § 42.100, Jul. 28, 2017.

* cited by examiner

TDD FDD COMMUNICATION INTERFACE

CROSS-REFERENCE TO RELATED APPLICATIONS

This application is a continuation of prior U.S. patent application Ser. No. 11/982,404 filed on Oct. 31, 2007 now abandoned, which claims priority to: U.S. patent application Ser. No. 09/839,499 filed on Apr. 20, 2001, now U.S. Pat. No. 7,346,347. U.S. patent application Ser. No. 09/839,499 claims priority to provisional U.S. Patent Application Ser. No. 60/262,708 filed on Jan. 19, 2001 and U.S. patent application Ser. No. 09/713,684 filed on Nov. 15, 2000.

This application claims priority to: provisional U.S. Patent Application Ser. No. 60/262,712 filed on Jan. 19, 2001 and entitled "WIRELESS COMMUNICATION SYSTEM USING BLOCK FILTERING AND FAST EQUALIZATION DEMODULATION AND METHOD OF OPERATION"; provisional U.S. Patent Application Ser. No. 60/262,825 filed on Jan. 19, 2001 and entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM"; provisional U.S. Patent Application Ser. No. 60/262,698 filed on Jan. 19, 2001 and entitled "APPARATUS AND METHOD FOR OPERATING A SUBSCRIBER INTERFACE IN A FIXED WIRELESS SYSTEM"; provisional U.S. Patent Application Ser. No. 60/262,827 filed on Jan. 19, 2001 entitled "APPARATUS AND METHOD FOR CREATING SIGNAL AND PROFILES AT A RECEIVING STATION"; provisional U.S. Patent Application Ser. No. 60/262,826 filed on Jan. 19, 2001 and entitled "SYSTEM AND METHOD FOR INTERFACE BETWEEN A SUBSCRIBER MODEM AND SUBSCRIBER PREMISES INTERFACE"; provisional U.S. Patent Application Ser. No. 60/262,951 filed on Jan. 19, 2001 entitled "BACKPLANE ARCHITECTURE FOR USE IN WIRELESS AND WIRELINE ACCESS SYSTEMS"; provisional U.S. Patent Application Ser. No. 60/262,824 filed on Jan. 19, 2001 entitled "SYSTEM AND METHOD FOR ON-LINE INSERTION OF LINE REPLACEABLE UNITS IN WIRELESS AND WIRELINE ACCESS SYSTEMS"; provisional U.S. Patent Application Ser. No. 60/263,101 filed on Jan. 19, 2001 entitled "SYSTEM FOR COORDINATION OF TDD TRANSMISSION BURSTS WITHIN AND BETWEEN CELLS IN A WIRELESS ACCESS SYSTEM AND METHOD OF OPERATION"; provisional U.S. Patent Application Ser. No. 60/263,097 filed on Jan. 19, 2001 and entitled "REDUNDANT TELECOMMUNICATION SYSTEM USING MEMORY EQUALIZATION APPARATUS AND METHOD OF OPERATION"; provisional U.S. Patent Application Ser. No. 60/273,579 filed Mar. 5, 2001 and entitled "WIRELESS ACCESS SYSTEM FOR ALLOCATING AND SYNCHRONIZING UPLINK AND DOWNLINK OF TDD FRAMES AND METHOD OF OPERATION"; provisional U.S. Patent Application Ser. No. 60/262,955 filed Jan. 19, 2001 and entitled "TDD FDD AIR INTERFACE"; provisional U.S. Patent Application Ser. No. 60/262,708 filed on Jan. 19, 2001 and entitled "APPARATUS, AND AN ASSOCIATED METHOD FOR PROVIDING WLAN SERVICE IN A FIXED WIRELESS ACCESS COMMUNICATION SYSTEM"; provisional U.S. Application Ser. No. 60/273,689 filed on Mar. 5, 2001 and entitled "WIRELESS ACCESS SYSTEM USING MULTIPLE MODULATION FORMATS IN TDD FRAMES AND METHOD OF OPERATION"; provisional U.S. Patent Application Ser. No. 60/273,757 filed Mar. 5, 2001 and entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE"; provisional U.S. Patent Application Ser. No. 60/270,378 filed Feb. 21, 2001 and entitled "APPARATUS FOR ESTABLISHING A PRIORITY CALL IN A FIXED WIRELESS ACCESS COMMUNICATION SYSTEM"; provisional U.S. Patent Application Ser. No. 60/270,385 filed Feb. 21, 2001 and entitled, "APPARATUS FOR REALLOCATING COMMUNICATION RESOURCES TO ESTABLISH A PRIORITY CALL IN A FIXED WIRELESS ACCESS COMMUNICATION SYSTEM"; and provisional U.S. Patent Application Ser. No. 60/270,430 filed Feb. 21, 2001 and entitled "METHOD FOR ESTABLISHING A PRIORITY CALL IN A FIXED WIRELESS ACCESS COMMUNICATION SYSTEM. Each of these applications and/or patents are hereby incorporated by reference herein in their entireties.

In addition, the subject matter disclosed in the present application is related to that disclosed in the following U.S. patent applications:

1) Ser. No. 10/042,705, filed on Nov. 15, 2000, entitled "SUBSCRIBER INTEGRATED ACCESS DEVICE FOR USE IN WIRELESS AND WIRELINE ACCESS SYSTEMS", now abandoned;
2) Ser. No. 09/838,810 filed Apr. 20, 2001, and entitled "WIRELESS COMMUNICATION SYSTEM USING BLOCK FILTERING AND FAST EQUALIZATION-DEMODULATION AND METHOD OF OPERATION", now U.S. Pat. No. 7,075,967;
3) Ser. No. 09/839,726 filed Apr. 20, 2001, and entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM", now U.S. Pat. No. 7,099,383;
4) Ser. No. 09/839,729 filed Apr. 20, 2001, and entitled "APPARATUS AND METHOD FOR OPERATING A SUBSCRIBER INTERFACE IN A FIXED WIRELESS SYSTEM", abandoned;
5) Ser. No. 09/839,719 filed Apr. 20, 2001, and entitled "APPARATUS AND METHOD FOR CREATING SIGNAL AND PROFILES AT A RECEIVING STATION", now U.S. Pat. No. 6,947,477;
6) Ser. No. 09/838,910 filed Apr. 20, 2001, and entitled "SYSTEM AND METHOD FOR INTERFACE BETWEEN A SUBSCRIBER MODEM AND SUBSCRIBER PREMISES INTERFACES", now U.S. Pat. No. 6,564,051;
7) Ser. No. 09/839,509 filed Apr. 20, 2001 and entitled "BACKPLANE ARCHITECTURE FOR USE IN WIRELESS AND WIRELINE ACCESS SYSTEMS", abandoned;
8) Ser. No. 09/839,514 filed Apr. 20, 2001, and entitled "SYSTEM AND METHOD FOR ON-LINE INSERTION OF LINE REPLACEABLE UNITS IN WIRELESS AND WIRELINE ACCESS SYSTEMS", now U.S. Pat. No. 7,069,047;
9) Ser. No. 09/839,512 filed Apr. 20, 2001, and entitled "SYSTEM FOR COORDINATION OF TDD TRANSMISSION BURSTS WITHIN AND BETWEEN CELLS IN A WIRELESS ACCESS SYSTEM AND METHOD OF OPERATION", now U.S. Pat. No. 6,804,527;
10) Ser. No. 09/839,259 filed Apr. 20, 2001, and entitled "REDUNDANT TELECOMMUNICATION SYSTEM USING MEMORY EQUALIZATION APPARATUS AND METHOD OF OPERATION", now U.S. Pat. No. 7,065,098;

11) Ser. No. 09/839,457 filed Apr. 20, 2001, and entitled "WIRELESS'ACCESS SYSTEM FOR ALLOCATING AND SYNCHRONIZING UPLINK AND DOWNLINK OF TDD FRAMES AND METHOD OF OPERATION", now U.S. Pat. No. 7,002,929;

12) Ser. No. 09/839,075 filed Apr. 20, 2001, and entitled "TDD FDD AIR INTERFACE", now U.S. Pat. No. 6,859,655;

13) Ser. No. 09/839,458 filed. Apr. 20, 2001, and entitled "WIRELESS ACCESS SYSTEM USING MULTIPLE MODULATION FORMATS IN TDD FRAMES AND METHOD OF OPERATION", now U.S. Pat. No. 7,173,916;

14) Ser. No. 09/839,456 filed Apr. 20, 2001, and entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE", now U.S. Pat. No. 6,891,810;

15) Ser. No. 09/838,924 filed Apr. 20, 2001, and entitled "APPARATUS FOR ESTABLISHING A PRIORITY CALL IN A FIXED WIRELESS ACCESS COMMUNICATION SYSTEM", now U.S. Pat. No. 7,274,946;

16) Ser. No. 09/839,727 filed Apr. 20, 2001, and entitled "APPARATUS FOR REALLOCATING COMMUNICATION RESOURCES TO ESTABLISH A PRIORITY CALL IN A FIXED WIRELESS ACCESS COMMUNICATION SYSTEM", now U.S. Pat. No. 7,031,738;

17) Ser. No. 09/839,734 filed Apr. 20, 2001, and entitled "METHOD FOR ESTABLISHING A PRIORITY CALL IN A FIXED WIRELESS ACCESS COMMUNICATION SYSTEM", now U.S. Pat. No. 7,035,241;

18) Ser. No. 09/839,513 filed Apr. 20, 2001, and entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS", now U.S. Pat. No. 6,925,516; and 19) Ser. No. 09/948,059, filed Sep. 5, 2001, and entitled "WIRELESS ACCESS SYSTEM USING SELECTIVELY ADAPTABLE BEAM FORMING IN TDD FRAMES AND METHOD OF OPERATION", now U.S. Pat. No. 7,230,931.

The above applications are commonly assigned to the assignee of the present application. The disclosures of these related patent applications may share common subject matter and figures and are hereby incorporated by reference herein in their entireties.

The present disclosure is directed, in general, to communication network access systems and, more specifically, to access equipment for use in both wireless and wireline telecommunications systems.

BACKGROUND

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g. t TI/T3 lines in North America t E1/E3 lines in Europe). ISDN was a logical extension of the digital network that had evolved throughout the 1980s. The rollout of ISDN in Europe was highly successful. However, the rollout in the United States was not successful t due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percentage of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:
 a) ATM;
 b) Class 5 switch interfaces (domestic GR-303 and international VS.2);
 c) TCP/IP with quality-of-service QoS for voice over IP (VoIP) (i.e., RTP) and other H.323 media services;
 d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of 10-11, wireless access systems have time varying channels that typically provide bit error rates of 10-3 to 10-6. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

Wireless access systems, as well as other systems which employ a shared communications media, must also provide a mechanism for allocating available communications bandwidth among multiple transmitting and receiving groups. Many wireless systems employ either a time division duplex (TDD) time division multiple access (TDMA) or a frequency diversity duplex (FDD) frequency division multiple access (FDMA) allocation scheme illustrated by the timing diagram of FIGS. 3A and 3B. TDD 300 shares a single radio frequency (RF) channel F1 between the base and subscriber, allocating time slices between the downlink 301 (transmission from the base to the subscriber) and the uplink 302 (transmission from the subscriber to the base). FDD 310 employs two frequencies F1 and F2, each dedicated to either the downlink 311 or the uplink 312 and separated by a duplex spacing 313.

For wireless access systems which provide Internet access in addition to or in lieu of voice communications, data and other Web based applications dominate the traffic load and connections within the system. Data access is inherently asymmetric, exhibiting typical downlink-to-uplink ratios of between 4:1 and 14:1.

TDD systems, in which the guard point (the time at which changeover from the downlink 301 to the uplink 302 occurs) within a frame may be shifted to alter the bandwidth allocation between the downlink 301 and the uplink 302, have inherent advantages for data asymmetry and efficient use of spectrum in providing broadband wireless access. TDD systems exhibit 40% to 90% greater spectral efficiency for asymmetric data communications than FDD systems, and also support shifting of power and modulation complexity from the subscriber unit to the base to lower subscriber equipment costs.

Within the spectrum allocated to multi-channel multipoint distribution systems (MMDS), however, some spectrum is regulated for only FDD operation. Since the total spectrum allocated to MMDS is relatively small (2.5-2.7 GHz, or about 30 6 MHz channels), some service providers may desire to utilize the FDD-only spectrum, preferably utilizing the TDD-based equipment employed in other portions of the MMDS spectrum.

There is, therefore, a need in the art for enabling TDD-based equipment to operate utilizing frequencies reserved for FDD only operation.

In one embodiment the present disclosure provides a method of TDD operation in a first subscriber unit having a cable modem. The method includes receiving in the first subscriber unit a first signal from a first base station on a downlink frequency during a first time period. The method includes transmitting from the first subscriber unit a second signal to the first base station on an uplink frequency during a second time period following the first time period. The downlink frequency and the uplink frequency are separated by a predefined duplex spacing.

In another embodiment, the present disclosure provides a cable modem configured to use TDD in a first subscriber station. The modem includes a receiver circuit to receive a first signal on a first frequency designated for downlink transmission during a first time period. The modem also includes a transmitter circuit to transmit a second signal on a second frequency different from the first frequency and designated for uplink transmission during a second time period following the first time period. The first frequency is employed for downlink transmission to a second subscriber station during the second time period and the second frequency is employed for uplink transmission from the second subscriber station during the first time period.

In still another embodiment, the present disclosure provides a method of time sharing frequencies reserved for FDD operation for use in conjunction with a cable modem. The method includes receiving in the cable modem a first signal from a first base station on a downlink frequency during a first time period. The method also includes transmitting from the cable modem a second signal to the first base station on an uplink frequency during a second time period following the first time period, wherein the downlink frequency and the uplink frequency are separated by a predefined duplex spacing.

In a further embodiment, the present disclosure provides a cable modem configured to use TDD. The cable modem includes a transmitter circuit configured to transmit a first signal on a first frequency to a first subscriber station during a first time period and transmit a second signal on a second frequency, different from the first frequency, to a second subscriber station during a second time period following the first time period. The cable modem also includes a receiver circuit configured to receive a third signal on the second frequency from the second subscriber station during the first time period and receive a fourth signal on the first frequency from the first subscriber during the second time period.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless access network or in time division duplex (TDD) wireline applications such as, for example, cable modems.

Figure 1:
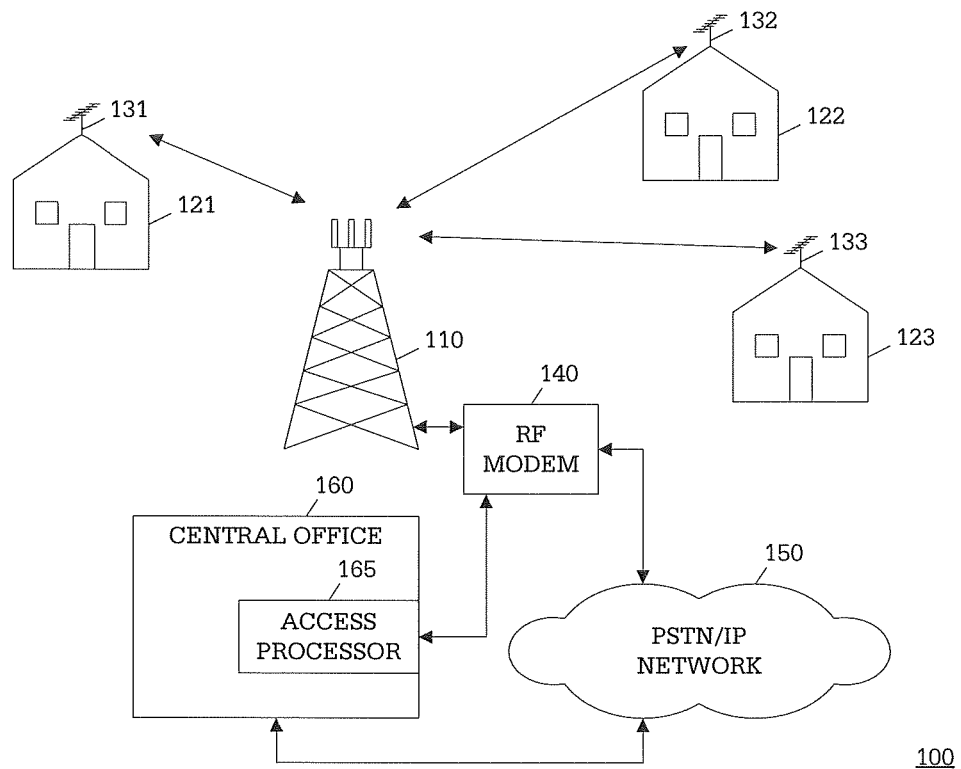
FIG. 1 illustrates exemplary wireless access network 100 according to one embodiment of the present disclosure.

FIG. 1 illustrates an exemplary fixed wireless access network 100 according to one embodiment of the present disclosure. Fixed wireless network 100 comprises a plurality of transceiver base stations, including exemplary transceiver base station 110, that transmit forward channel (i.e., downstream) broadband signals to a plurality of subscriber premises, including exemplary subscriber premises 121, 122 and 123, and receive reverse channel (i.e., upstream) broadband signals from the plurality of subscriber premises. Subscriber premises 121-123 transmit and receive via fixed, externally-mounted antennas 131-133, respectively. Subscriber premises 121-123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel signals from external network 150 and transmit the reverse channel signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem 140, which, among other things, up-converts baseband data traffic received from external network 150 to RF signals transmitted in the forward channel to subscriber premises 121-123. RF modem 140 also down-converts RF signals received in the reverse channel from subscriber premises 121-123 to baseband data traffic that is transmitted to external network 150. In an exemplary embodiment of the present disclosure in which external network 150 is the public switched telephone network (PSTN), RF modem 140 transmits baseband data traffic to, and receives baseband data traffic from, access processor 165, which is disposed in central office facility 160 of the PSTN.

It should be noted that network 100 was chosen as a fixed wireless network only for the purposes of simplicity and clarity in explaining a subscriber integrated access device according to the principles of the present disclosure. The choice of a fixed wireless network should not be construed in any manner that limits the scope of the present disclosure in any way. As will be explained below in greater detail, in alternate embodiments of the present disclosure, a subscriber integrated access device according to the principles of the present disclosure may be implemented in other types of broadband access systems, including wireline systems (i.e., digital subscriber line (DSL), cable modem, fiber optic, and the like) in which a wireline connected to the subscriber integrated access device carries forward and reverse channel signals.

Figure 2A:
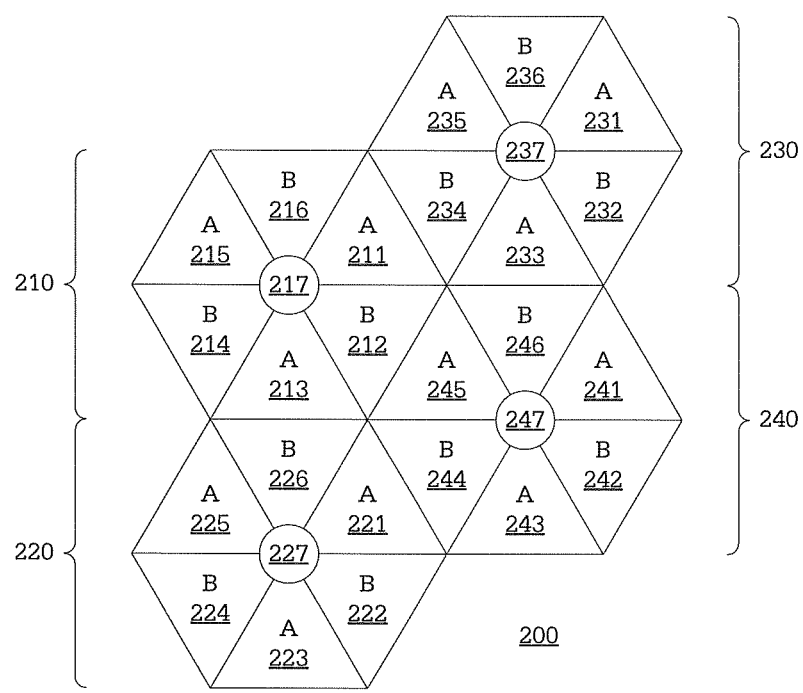
FIGS. 2A-2B depict cell and sector layouts for a wireless access coverage area according to various embodiments of the present disclosure.

FIG. 2A depicts a cell and sector layout for a wireless access coverage area according to one embodiment of the present disclosure. Coverage area 200 is logically divided into cells 210, 220, 230 and 240 each logically divided into a number of sectors 211-216, 221-226, 231-236 and 241-246, respectively. Each cell 210, 220, 230 and 240 includes a transceiver base station 110 as depicted in FIG. 1 at a central location 217, 227, 237, and 247, respectively, as well as subscriber premises 121-123 within the coverage area of the respective cell.

Sectors 211-216, 221-226, 231-236 and 241-246 are logically divided into two categories: those designated sector type "A" and those designated sector type "B", with sector categories alternating within a cell so that no two adjacent cells fall in the same category and with cells arranged so that no two adjacent sectors from adjoining cells fall in the same category. Each sector is falls within a different category than all other adjacent sectors with which the respective sector shares a common linear boundary.

Figure 3A:
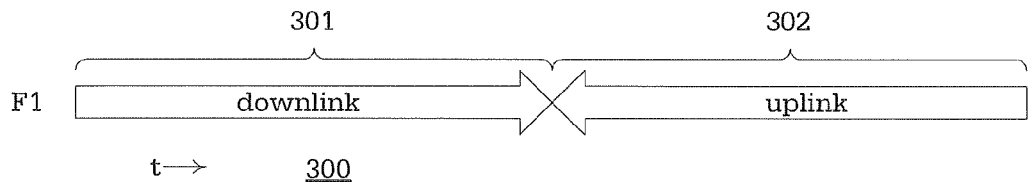
FIGS. 3A-3E are comparative high level timing diagrams illustrating the bandwidth allocation among sectors and cells according to the prior art and according to one embodiment of the present disclosure.
Figure 3B:
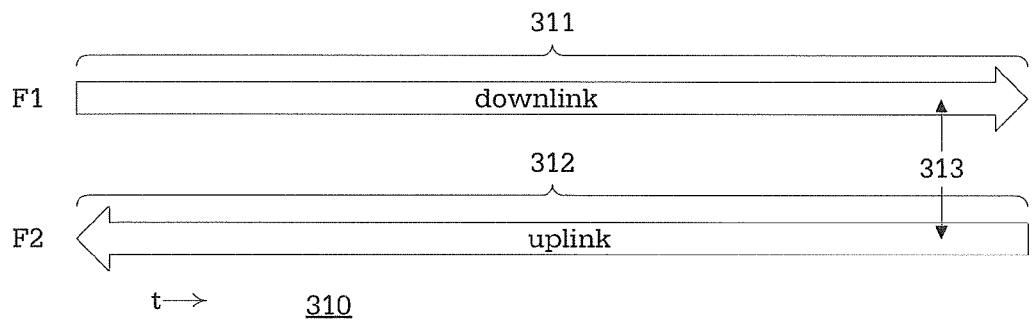
Figure 3C:
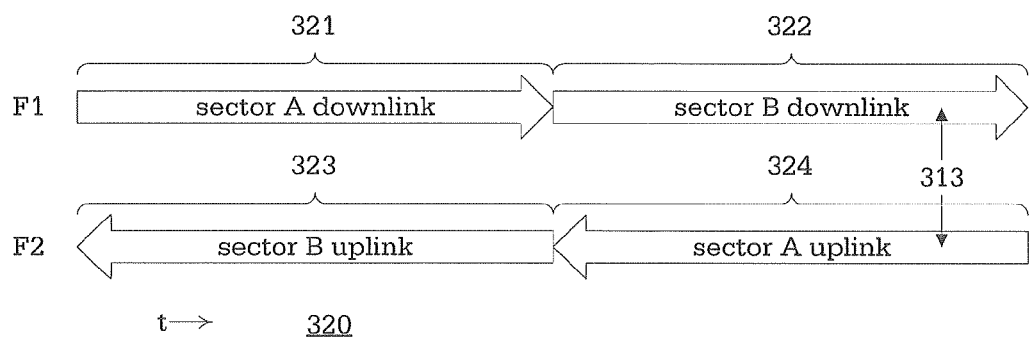
Figure 3D:
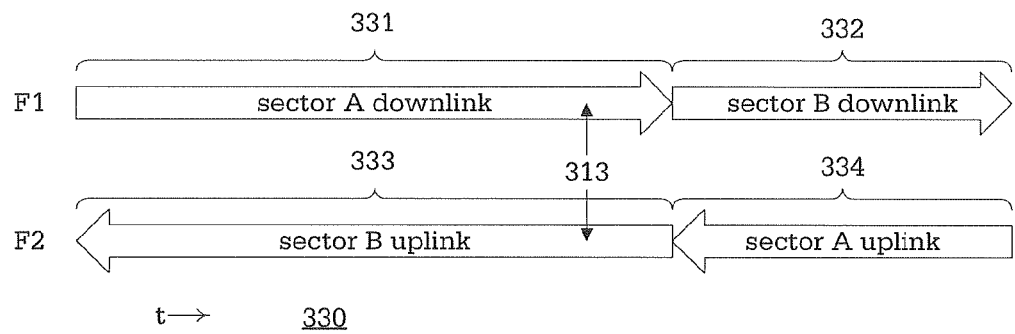
Figure 3E:
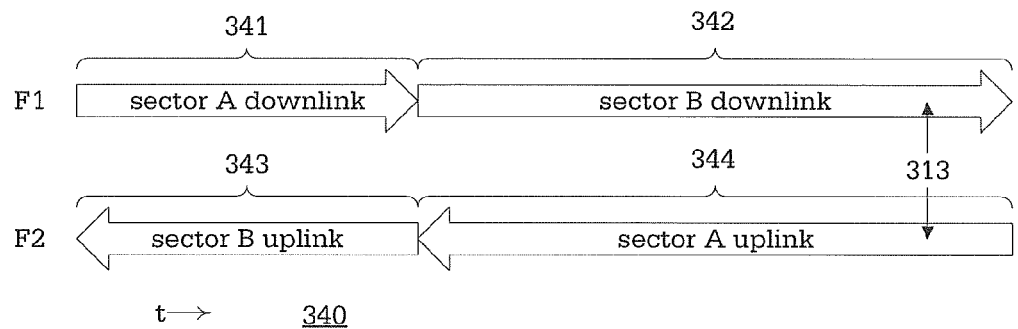

FIGS. 3C through 3E are high level timing diagrams illustrating bandwidth allocation among sectors according to one embodiment of the present disclosure, and are intended to be read in conjunction with FIG. 2A. The present disclosure incorporates FDD operation, with dedicated downlink and uplink channels, within a TDD system by introducing a frequency change at the normal. TDD guard point. Transmission time on the dedicated downlink frequency F1 and the dedicated uplink frequency F2 are divided between adjacent sectors within Categories A and B. Thus, the TDD FDD system 320 of the present disclosure allocates both a downlink period 321, 322 on the downlink frequency F1 and an uplink period 323, 324 on the uplink frequency F2 to each of the sectors within categories A and B.

The allocated periods 312/322 and 323/324 are offset in both time and frequency, then overlaid so that the sector A downlink period 321 does not coincide in time or frequency with the sector A uplink period 324 and the sector B downlink period 322 does not coincide in time or frequency with sector B uplink period 323. Instead, downlink transmission 321 in each sector within category A occurs at the same time as uplink transmission 323 within each sector within category B, while downlink transmission 322 in each sector within category B occurs concurrently with uplink transmission 324 for each sector within category A.

In this manner, the dedicated downlink frequency F1 and the dedicated uplink frequency F2 are time-shared by adjacent sectors, but remain dedicated to downlink or uplink transmission and may utilize FDD-only bandwidth within the MMDS spectrum. Duplex spacing 313 between downlink and uplink frequencies F1 and F2 (typically 50-70 MHz) is also maintained.

Figure 4:
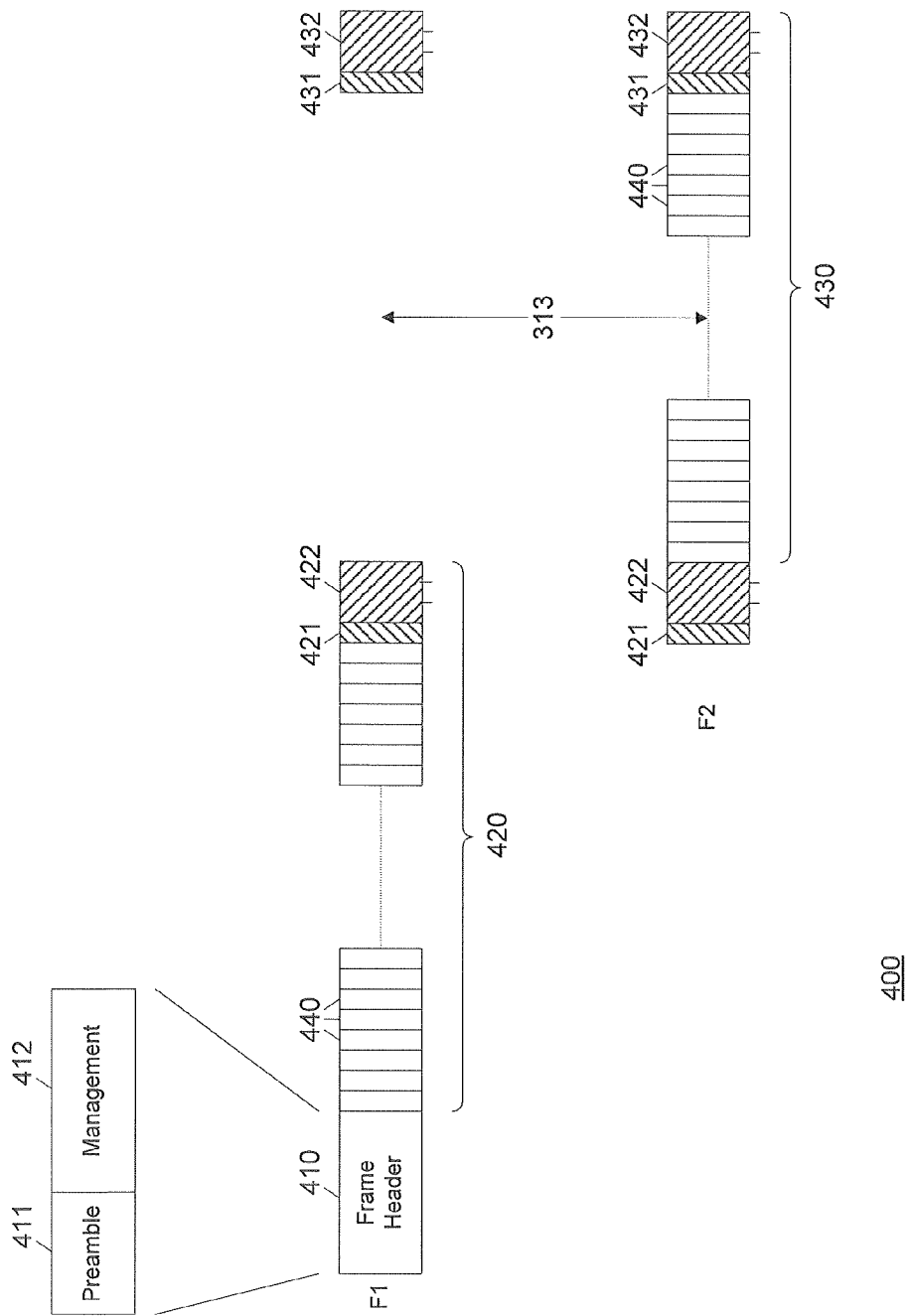
FIG. 4 depicts in greater detail a frame structure employed within the exemplary bandwidth allocation scheme according to one embodiment of the present disclosure.

FIG. 4 depicts in greater detail a frame structure employed within the exemplary bandwidth allocation scheme according to one embodiment of the present disclosure, and is intended to be read in conjunction with FIGS. 2 and 3C through 3E. The frame 400 depicted corresponds to each of the sectors within category A described above and depicted in FIGS. 2A and 3C through 3E, although each sector within category would utilize a similar frame, as described in further detail below.

Frame 400 includes a frame header 410, a downlink sub-frame 420, and an uplink sub-frame 430, with the downlink and uplink sub-frames logically divided into a number of physical slots 440. The frame header 410 includes a preamble 411 containing a start-of-frame field, which allows subscribers using fixed diversity to test reception conditions of the two diversity antennas, and a physical layer (the air interface is layered as a physical layer and a media access layer) media dependent convergence field, utilized to assist in synchronization and time/frequency recovery at the receiver. The preamble 411 is followed by media access management information 412, which includes a downlink MAP identifying the physical slot where the downlink ends and the uplink begins, an uplink MAP indicating uplink subscriber access grants and the associated physical slot start of the grant, and other management messages such as acknowledge (ACK) response, etc.

During the downlink sub-frame 420, the base transmitter and the subscriber receiver are both set to the downlink frequency F1. The downlink sub-frame 420 terminates with a frequency change physical slot 421, during which multistage digital filters within both the base and the subscriber unit are altered to switch to the uplink frequency F2, followed by a transmitter transition guard time 422, during which no transmission occurs to allow for propagation delays for all subscriber units. The transmitter transition guard time 422, depicted as occupying three physical slots in FIG. 4, is fully programmable both in position and duration, set by management physical layer attribute messages.

During the downlink sub-frame 430, the base receiver and the subscriber transmitter(s) are both set to the uplink frequency F2. The first physical slots within the uplink sub-frame 430 are subscriber registration or acquisition uplink ranging slots, utilized for both initial uplink synchronization of subscribers performing entry into the network and periodic update of synchronization of active subscribers, followed by contention slots, providing a demand access request mechanism to establish subscriber service for a single traffic service flow. When collisions occur within the contention slots, the subscriber employs a random back-off in integer frame periods and retries based on a time out for request of service. Contention slots use the lowest possible modulation, forward error correction (FEC), and orthogonal expansion supported by the base. The number and position of registration and contention slots within the uplink sub-frame 430 is set by the uplink MAP message within the media access management information portion 412 of the frame header 410.

The contention slots within the uplink sub-frame 430 are followed by individual subscriber transmissions which have been scheduled and allocated by the base in the uplink MAP, with each subscriber transmission burst performed at the maximum modulation, FEC and orthogonal expansion supported by the subscriber unit. The uplink sub-frame 430 terminates with a frequency change physical slot 431, during which both the base and the subscriber unit switch to the downlink frequency F1, followed by a receiver transition guard time 432, which is also programmable.

Frames for sectors falling within category B will have a similar structure, but will be offset so that the downlink sub-frame of each category B sector corresponds in time with the uplink sub-frame of each category A sector, and the uplink sub-frame of each category B sector corresponds in time with the downlink sub-frame of each category A sector. The boundary between downlink and uplink sub-frames is adaptive utilizing block equalization and burst timing coordination. Accordingly, uplink and downlink allocations to sectors in categories A and B may be divided equally as shown in FIG. 3C. or may be split to allow greater time within a particular frame to the downlink for sectors in category A, as shown in FIG. 3D, or to the downlink for sectors in category B, as shown in FIG. 3E. Spectral efficiency is therefore improved by adapting to the instantaneous traffic requirements among various sectors.

Figure 2B:
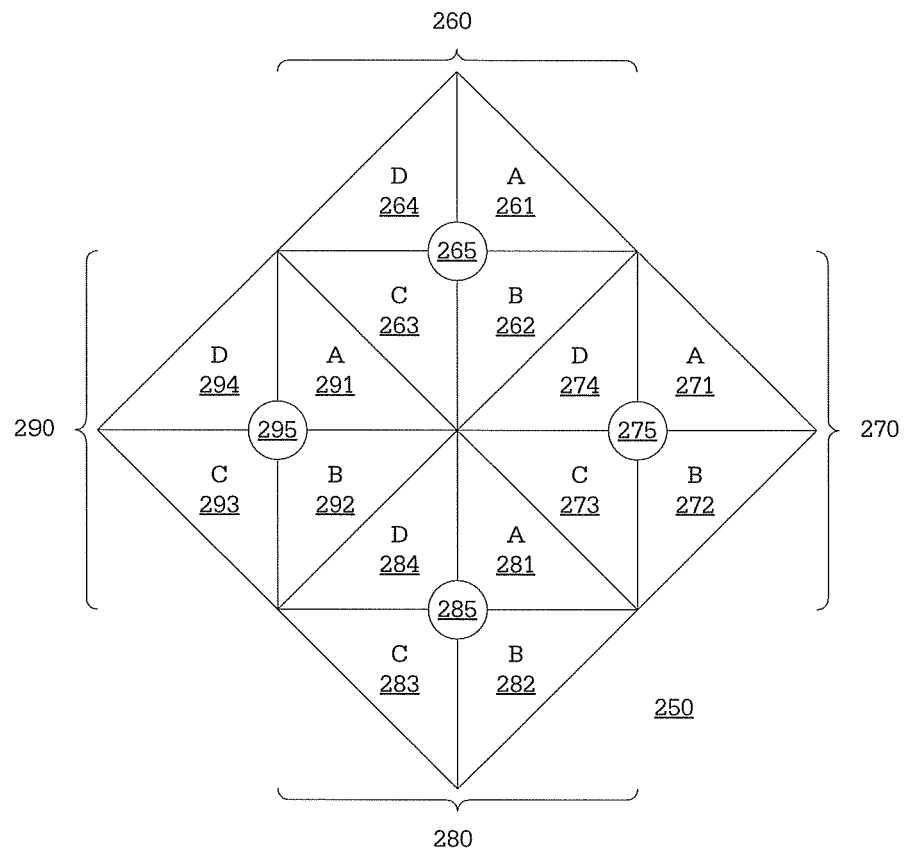

While the exemplary embodiment is described above with six sector cells and only two sector categories for the purposes of simplicity and clarity in describing the disclosure, the present disclosure may be extended to any number of sector categories equal to a power of 2 (e.g., 2, 4, 8, . . . , etc.), and preferably employs four sector categories. Where more than two sector categories are employed, downlink and uplink frequencies may be reused in pairs or in staggered offsets (e.g., each sector A shares a downlink frequency F1 with one adjacent sector B but shares an uplink frequency F2 with a different adjacent sector C, etc.). FIG. 2B depicts a cell and sector layout for a wireless access coverage area according to an alternative embodiment of the present disclosure. Coverage area 250 is logically divided into cells 260, 270, 280 and 290 each logically divided into four sectors 261-264, 271-274, 281-284 and 291-294, respectively. Each cell 260, 270, 280 and 290 includes a transceiver base station 110 as depicted in 28 FIG. 1 at a central location 265, 275, 285, and 295, as well as subscriber premises 121-123 within the coverage area of the respective cell.

Sectors 261-264, 271-274, 281-284 and 291-294 in the alternative embodiment are logically divided into four categories, designated sector type "A", "B", "C" and "D", with sector categories arranged within a cell and between cells so that no two adjacent cells fall in the same category and no cell adjoins two or more cells in the same category. Each sector falls within a different category than all other adjacent sectors with which the respective sector shares a common linear boundary.

Figure 5:
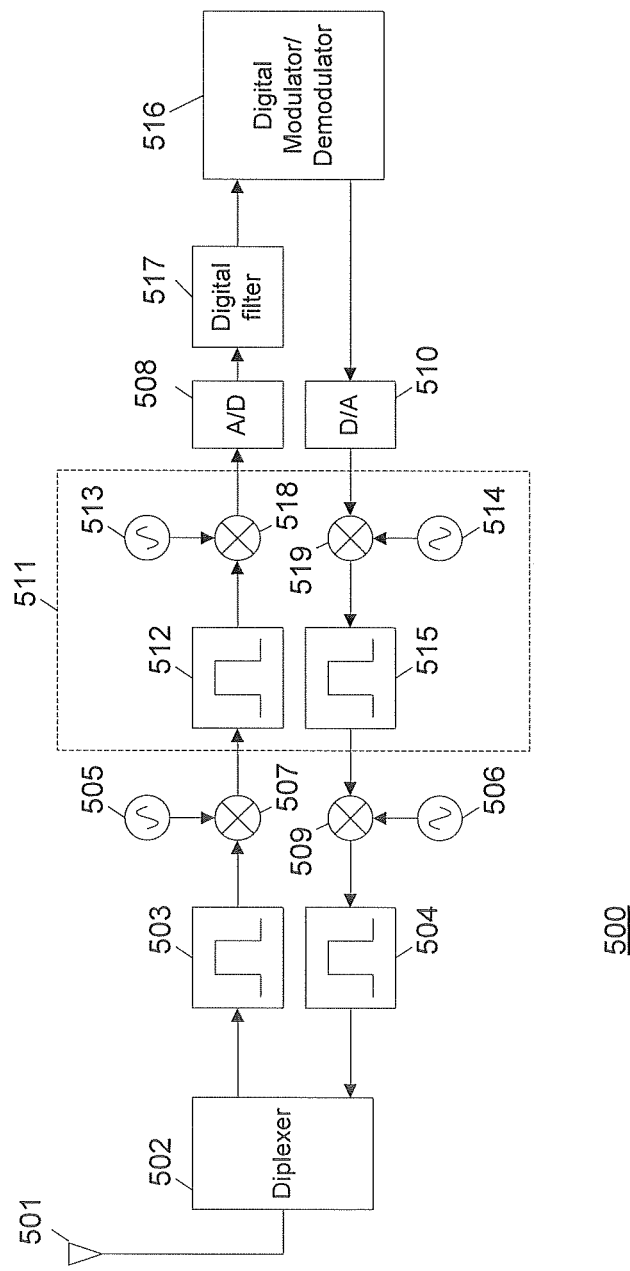
FIG. 5 is functional diagram of filtering employed for wireless communication within each cell and sector in accordance with one embodiment of the present disclosure.

FIG. 5 is functional diagram of filtering employed for wireless communication within each cell in accordance with one embodiment of the present disclosure, and is intended to be read in conjunction with FIGS. 1, 2A-2B, 3C-3E, and 4. The filtering system 500 depicted is implemented within each transceiver base station 110 and each subscriber access device on subscriber premises 121-123. The parameters for filtering system 500 implemented within each subscriber premises 121-123 will be described, although those skilled in the art will recognize that the filtering systems within each transceiver base station 110 will simply have the transmission and reception frequencies downlink or uplink frequencies F1 and F2) reversed or otherwise changed.

Wireless signals at the appropriate downlink and uplink frequencies F1 and F2 for the subject cell and sector are transmitted and received via antenna 501 and separated by a diplexer 502. Signals received from or passed to diplexer 502 are filtered utilizing filters 503 and 504 tuned to downlink and uplink frequencies F1 and F2, respectively. The signal received from filter 503 is mixed with a signal from a local oscillator 505 tuned to the downlink frequency F1 f while the signal transmitted to filter 504 is mixed with a signal from a local oscillator 506 tuned to the uplink frequency F2. If direct conversion is utilized, the output of mixer 507 may be connected directly to analog-to-digital (A/D) converter 508, and the input to mixer 509 may be connected directly to digital-to-analog (D/A) convert 510.

If super heterodyne conversion is employed, as is preferable, filtering system 500 includes a second (optional) conversion stage 511. Within conversion stage 5111 the output of mixer 507 passes to a filter 512 tuned to an image frequency based on the downlink frequency F1, with the filtered output being mixed with a signal from a local oscillator 513 also tuned to the image frequency based on downlink frequency F1 before being passed to A/D converter 508. Similarly, signals from D/A converter 510 are mixed with a signal from a local oscillator 514 tuned to an image frequency based on the uplink frequency F2 and is passed through a filter 515 also tuned to the image frequency based on the uplink frequency F2 before being passed to mixer 509.

A/D and D/A converters 508 and 510 are coupled to a digital modulator/demodulator 516 which decodes and generates the digital signals from the wireless communications downlinks and uplinks. Additional digital filtering 517 may optionally be employed between A/D converter 508 and modulator/demodulator 516. The filters 503, 504, 512 and 515, mixers 507, 509, 518 and 519, A/D/ and D/A converters 508 and 510, digital filter 517, and digital modulator/demodulator 516 may be implemented in either hardware or software, collectively, individually, or in any combination of the individual elements.

Filtering system 500 should have two essential characteristics for successful implementation of a TDD FDD system in accordance with one embodiment of the present disclosure. First, the frequency switching time between the uplink and downlink frequencies for the filtering system 500 within all transceivers (within each transceiver base station 110 and each subscriber premises 121-123) must be sufficiently fast to complete during the frequency change physical slots 421 and 431. Frequency change physical slots 421 and 431, together with guard times 422 and 432, insure that transmission of an uplink/downlink sub-frame is completed successfully before transmission of the next sub-frame is started. Frequency switching should preferably take no longer than ¼ to ¹⁄₁₀ the duration of physical slots 421 and 431. Physical slots 421 and 431 and/or guard times 422 and 432 may alternatively be extended in duration to accommodate longer frequency switching times within a transceiver between the downlink and uplink frequencies.

Figure 6:
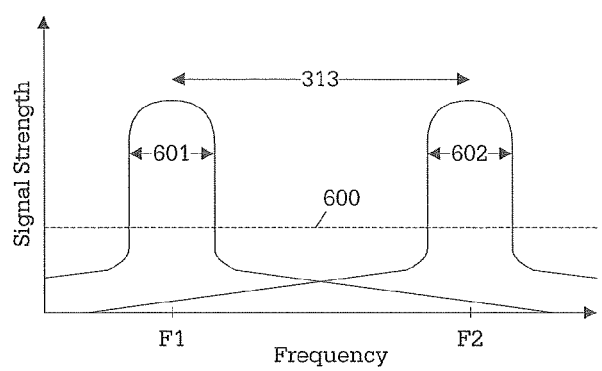
FIG. 6 illustrates a spectral response for filtering employed for wireless communication within each cell and sector in accordance with one embodiment of the present disclosure.

Second, filtering system 500 must filter transmitted and received signals in depth to ensure, in conjunction with the duplex spacing employed between the downlink and uplink frequencies F1 and F2, that spurious out-of-band transmission products do not interfere with the receiver. FIG. 6 illustrates a spectral response for filtering employed for wireless communication within each cell and sector in accordance with one embodiment of the present disclosure. A signal strength 600 at which unacceptable interference prevents successful communication may be identified or defined for a particular system. Filtering system 500 should pass signals within the band 601 allocated to downlink frequency F1 and within the band 602 allocated to uplink frequency F2. By virtue of duplex spacing 313 between the downlink and uplink frequencies F1 and F2, together with the in-depth filtering performed by filtering system 500, out-of-band signals are sufficiently rejected to prevent the signal strength from approaching interference level 600.

Figure 7:
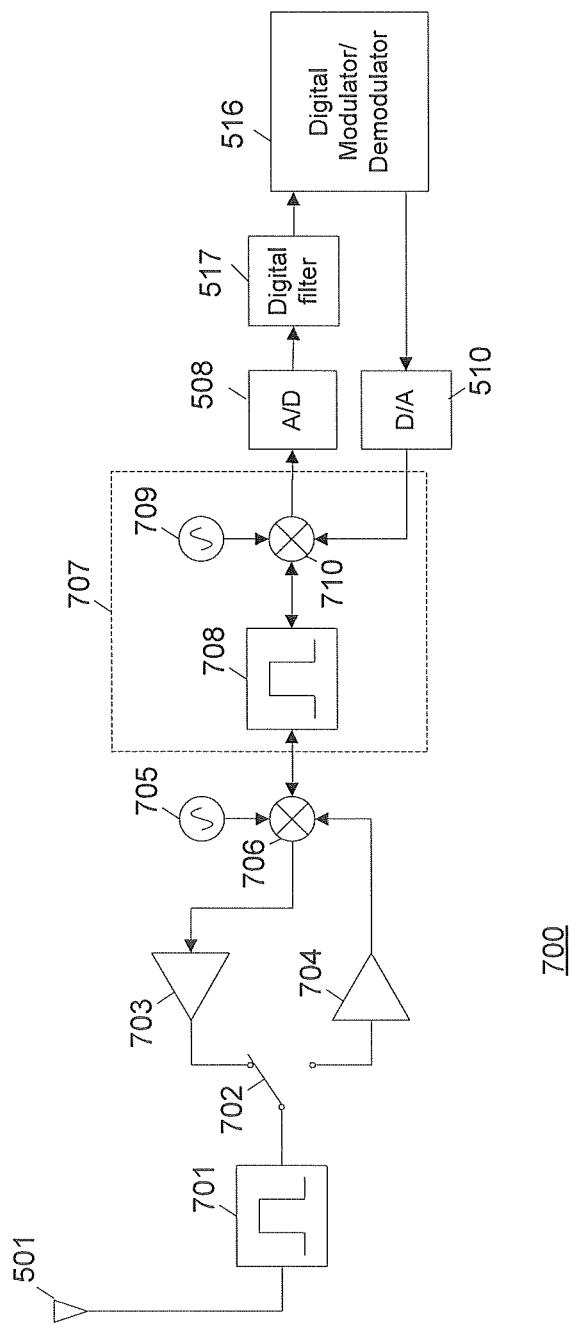
FIG. 7 is functional diagram of filtering employed for wireless communication within each cell and sector in accordance with another embodiment of the present disclosure.

FIG. 7 is functional diagram of filtering employed for wireless communication within each cell and sector in accordance with another embodiment of the present disclosure. Filtering system 700 receives wireless signals at the appropriate downlink and uplink frequencies F1 and F2 for the subject cell and sector via antenna 501. Signals received from or passed to antenna 501 are filtered utilizing filter 701, which covers the full FDD band employed for the subject sector. A switch 702 selective connects the filter 701 to a power amplifier (PA) 703 for transmission or to a low noise amplifier (LNA) 704 for reception.

In the embodiment depicted in FIG. 7, the conversion stages coupled to power amplifier 703 and low noise amplifier 704 are bidirectional, and as a result of the TDD aspect of the signal pattern employed may be reused for both transmitting and receiving signals. Local oscillator 705 coupled to mixer 706 should be capable of switching frequencies, converting signals at either the downlink frequency F1 or the uplink frequency F2 to an image frequency. Optional second stage 707 for superheterodyne conversion includes a filter 708 and local oscillator 709 both tuned to the image frequency and a mixer 710. A/D converter 508 and D/A converter 510 are both connected to mixer 710.

The FDD TDD strategy of the present disclosure permits filtering and conversion to be performed along a single, bidirectional signal path which is reused for both the downlink and the uplink, eliminating the need for separate paths and reducing the system costs. The spectral performance illustrated in FIG. 6 should be implemented by filtering system 700, with the frequency switching time for local oscillator 705 within the first conversion stage being critical to meeting the timing requirements imposed by the FDD TDD system of the present disclosure.

It is important to note that while the present disclosure has been described in the context of a fully functional data processing system and/or network, those skilled in the art will appreciate that the mechanism of the present disclosure is capable of being distributed in the form of a computer usable medium of instructions in a variety of forms, and that the present disclosure applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

Although the present disclosure has been described in detail, those skilled in the art should understand that they can make various changes, substitutions and alterations herein without departing from the spirit and scope of the disclosure in its broadest form.

What is claimed is:
1. A cable modem configured to use time division duplex (TDD) in a first subscriber station, the cable modem comprising:
 a receiver circuit configured to receive a first signal on a first frequency designated for downlink transmission during a first time period; and
 a transmitter circuit configured to transmit a second signal on a second frequency different from the first frequency and designated for uplink transmission during a second time period following the first time period, wherein the first frequency is employed for downlink transmission to a second subscriber station during the second time period and the second frequency is employed for uplink transmission from the second subscriber station during the first time period.

2. A method of using time division duplex (TDD), comprising:

receiving a first signal on a first frequency designated for downlink transmission during a first time period using a receiver of a device; and transmitting a second signal on a second frequency different from the first frequency and designated for uplink transmission during a second time period following the first time period using a transmitter of the device;

wherein the first frequency is employed for downlink transmission to a second subscriber station during the second time period and the second frequency is employed for uplink transmission from the second subscriber station during the first time period.

* * * * *